United States Patent Office 2,870,164
Patented Jan. 20, 1959

2,870,164
PROCESS FOR MAKING d,l-METHYSTICIN AND d,l-DIHYDROMETHYSTICIN

Murle W. Klohs, Northridge, and Fred Keller and Robert E. Williams, Los Angeles, Calif., assignors to Riker Laboratories, Inc., Los Angeles, Calif., a corporation of Delaware No Drawing. Application September 19, 1956
Serial No. 610,717

6 Claims. (Cl. 260—340.5)

This invention relates to novel chemical compounds, more particularly to d,l-methysticin and d,l-dihydromethysticin, and to a novel process for preparing them.

The compounds according to the present invention possess physiological activity, and more particularly possess anti-convulsant and sedative effects which are well demonstrated by their ability to prevent strychnine-induced convulsions and to potentiate barbiturate sleep time in mice. Clinically, these compounds are useful as tranquilizers, mild sedatives or anti-convulsants.

Hitherto d,l-methysticin and d,l-dihydromethysticin have been unknown. The d-isomers only have been known to exist in *Piper Methysticum L.*, a root used by natives in the South Sea islands, but the extraction of these pure d-isomers from the root has been possible only in low yields and by tedious methods. Attempts to synthesize d-methysticin and d-dihydromethysticin have been unsuccessful.

In accordance with the present invention it is now possible to produce d,l-methysticin and d,l-dihydromethysticin in good yields. By the process of this invention it is possible to produce these compounds economically for the first time and it enables them to be prepared in pure form on a commercial scale. By the process of this invention it is also possible to prepare these new compounds from relatively inexpensive starting materials.

Furthermore, it has been found unexpectedly that d,l-methysticin and d,l-dihydromethysticin are equally as active pharmacologically as the corresponding naturally-occuring d-compounds. Thus the present invention provides racemic compounds having physiological activity substantially equal to that of the natural d-compounds, but which may be produced economically and in relatively pure form by chemical synthesis.

It is an object of the present invention to provide novel chemical compounds having desirable physiological properties.

It is also an object of the present invention to provide a novel process for producing these compounds.

Other objects will be apparent to those skilled in the art from reading this specification.

The compounds of the invention comprise a racemic chemical compound represented by the formula

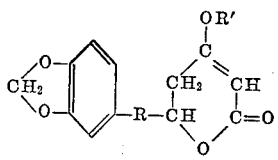

wherein R is a member of the group consisting of —CH=CH— and —CH$_2$—CH$_2$—, and R' is a lower alkyl group, such as methyl, ethyl, n-propyl and n-butyl, etc.

The novel process for producing the racemic compounds of the invention comprises condensing 3,4-methylenedioxycinnamaldehyde with an alkyl-gamma-halo-beta-alkoxy crotonate in an inert organic solvent for the reactants in the presence of a catalyst, such as metallic zinc. The alkyl and alkoxyl groups of the crotonate are desirably lower groups. The preferred crotonate is methyl-gamma-bromo-beta-methoxycrotonate. The product produced is the racemic compound of the structural formula above wherein R is —CH=CH—, for example, d,l-methysticin. Where it is desired to produce the corresponding dihydro-compound, such as d,l-dihydromethysticin, this product is catalytically hydrogenated in accordance with general hydrogenation techniques with which those skilled in the art are well familiar. One desirable hydrogenation catalyst is palladium on carbon.

In order more clearly to disclose the nature of the present invention, specific examples will hereinafter be described. It should be understood, however, that this is done solely by way of example and is intended neither to delineate the scope of the invention nor limit the ambit of the appended claims.

EXAMPLE I d,l-Methysticin 3,4-methylenedioxycinnamaldehyde (58.6 grams; 0.33 mole) and methyl-gamma-bromo-beta-methoxycrotonate (70 grams; 0.33 mole) were dissolved in 1 liter of tetrahydrofuran (the tetrahydrofuran was distilled over calcium hydride and mineral oil and stored over metallic sodium prior to use). This solution was added dropwise through a dropping funnel into a dry 3 neck round bottom flask equipped with stirrer and reflux condensor and containing finely cut zinc sheet metal (25 grams; 0.38 mole). The zinc metal, immediately prior to the reaction, was sanded, cut into small strips and washed consecutively with 2% hydrochloric acid, water, methanol, acetone and ether and then dried at 100° C. A small crystal of iodine was added to help initiate the reaction and the solution was refluxed, with stirring, for 5 hours. At the end of this time the reaction mixture (reddish-brown in color) was cooled to room temperature and added to a saturated solution of ammonium chloride (2.5 liters) with stirring. The mixture was extracted twice with chloroform (1500 ml. portions) and the combined chloroform extracts washed once with water (500 ml.), filtered through anhydrous sodium sulfate and concentrated on the steam bath in vacuo to a resinous mass which on standing overnight at room temperature formed a solid mass of crystals. These crystals were triturated with ether (500 ml.) and filtered to give 35 grams of crude d,l-methysticin (light brown in color) for a yield of 38.5%. The material was recrystallized by dissolving it in hot methanol (10 ml. per gram) and allowing it to stand at room temperature. The weight was 31 grams and the material had a melting point of 132–134° C. The infrared and ultraviolet absorption spectra were identical with those of naturally occurring methysticin. The material gave the following analysis:

| Analysis | Found | Calculated for C$_{15}$H$_{14}$O$_5$ |
|---|---|---|
| Rast molecular wt. | 285 | 274.26 |
| Carbon_____percent | 65.56 | 65.69 |
| Hydrogen_____do | 5.25 | 5.15 |
| Methoxyl_____do | 11.35 | 11.31 |

The optical rotation of the material in a 1% solution of 95% ethanol was taken at 25° C. when measured by the "D" line of sodium and found to be zero degrees. Under the same conditions the naturally occurring d-isomer gave a value of +77°.

EXAMPLE 2 d,l-Dihydromethysticin

Methysticin (25 grams) (prepared according to Example 1) was dissolved in 100 ml. of tetrahydrofuran. One gram of 10% palladium on carbon was added and the mixture was then hydrogenated. The hydrogenation was conducted at room temperature under a pressure of between one and two atmospheres. One molecular equivalent of hydrogen was taken up in 1–3 hours. The catalyst and solvent were removed and the residue was recrystallized from isopropanol. The yield of d,l-dihydromethysticin was 21 grams and had a melting point of 109–111° C. The infrared and ultraviolet spectra were identical with those of naturally occurring d-dihydromethysticin. The optical rotation was 0° in methanol compared with +21° (c 1, in MeOH) for the d-isomer. The material gave the following analysis:

| Analysis | Found | Calculated for $C_{15}H_{16}O_5$ |
|---|---|---|
| Rast molecular wt | 310 | 276.23 |
| Carbon percent | 64.99 | 65.21 |
| Hydrogen do | 5.85 | 5.84 |
| Methoxyl do | 11.74 | 11.23 |

In the foregoing examples, instead of tetrahydrofurane, other inert solvents may be employed such as benzene or diethyl ether. However we have found tetrahydrofurane for some non-apparent reason to be much superior for obtaining good yields of d,l-methysticin. When benzene or ether were used further purification steps were necessary.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

What is claimed is:

1. The process for producing a racemic chemical compound represented by the formula:

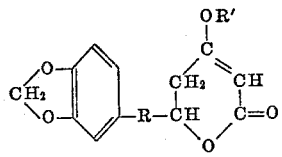

wherein R is a member of the group consisting of —CH=CH— and —CH$_2$—CH$_2$— and R' is a lower alkyl group, which comprises condensing 3,4-methylenedioxycinnamaldehyde and an alkyl-gamma-halo-beta-alkoxy crotonate.

2. The process as defined by claim 1 wherein the reaction is carried out in an inert organic solvent for the reactants in the presence of metallic zinc.

3. The process as defined by claim 2 wherein the inert organic solvent is tetrahydrofuran.

4. The process as defined by claim 1, wherein the reaction product is subsequently subjected to catalytic hydrogenation to produce the corresponding dihydro-compound.

5. The process according to claim 1 for producing d,l-methysticin which comprises condensing 3,4-methylenedioxycinnamaldehyde and a methyl-gamma-halo-beta-methoxy crotonate.

6. The process as defined by claim 4 wherein the reaction product, d,l-methysticin, is subsequently subjected to catalytic hydrogenation to produce d,l-dihydromethysticin.

References Cited in the file of this patent

Borsche et al.: Berichte, vol. 60, page 2114, 1927.
Karrer: Organic Chemistry, Elsevier Publishing Co., New York, 1938, page 88.
Beilsteins Handbuch der org. Chemie, Zweite Ergänz., vol. 19, page 431, Syst. #2965.